United States Patent
Finney et al.

(10) Patent No.: US 8,327,651 B2
(45) Date of Patent: Dec. 11, 2012

(54) TRANSCRITICAL FLUID COOLING FOR AEROSPACE APPLICATIONS

(75) Inventors: Adam M. Finney, Rocky Hill, CT (US); Young K. Park, Simsbury, CT (US); Scott F. Kaslusky, West Hartford, CT (US); Daniel R. Sabatino, East Hampton, CT (US)

(73) Assignee: Hamilton Sundstrand Corporation, Rockford, IL (US)

( * ) Notice: Subject to any disclaimer, the term of this patent is extended or adjusted under 35 U.S.C. 154(b) by 564 days.

(21) Appl. No.: 12/498,744

(22) Filed: Jul. 7, 2009

(65) Prior Publication Data
US 2011/0005244 A1 Jan. 13, 2011

(51) Int. Cl.
F25B 9/00 (2006.01)
(52) U.S. Cl. .................. 62/87; 62/114; 62/510
(58) Field of Classification Search .............. 62/87, 114, 62/239, 244, 498, 510, 513, 504, 512, 524, 62/527, 278
See application file for complete search history.

(56) References Cited

U.S. PATENT DOCUMENTS

| | | | |
|---|---|---|---|
| 4,045,972 A | 9/1977 | Tyree, Jr. | |
| 5,069,039 A | 12/1991 | Martin | |
| 5,890,370 A | 4/1999 | Sakakibara et al. | |
| 6,044,655 A | 4/2000 | Ozaki et al. | |
| 6,581,384 B1 * | 6/2003 | Benson | 60/653 |
| 6,698,214 B2 * | 3/2004 | Chordia | 62/114 |
| 6,877,340 B2 * | 4/2005 | Hiwata et al. | 62/527 |
| 6,923,016 B2 * | 8/2005 | Funakoshi et al. | 62/324.1 |
| 7,467,525 B1 | 12/2008 | Ohta et al. | |
| 2003/0167791 A1 * | 9/2003 | Chordia | 62/498 |
| 2004/0065088 A1 * | 4/2004 | Viteri et al. | 60/772 |
| 2004/0074254 A1 * | 4/2004 | Hiwata et al. | 62/402 |
| 2004/0083751 A1 * | 5/2004 | Nakatani et al. | 62/324.1 |
| 2004/0118138 A1 * | 6/2004 | Nakatani et al. | 62/197 |
| 2007/0068178 A1 * | 3/2007 | Honma et al. | 62/160 |
| 2007/0180852 A1 | 8/2007 | Sugiura et al. | |
| 2008/0104938 A1 * | 5/2008 | Finkenrath et al. | 60/39.5 |
| 2008/0127632 A1 * | 6/2008 | Finkenrath et al. | 60/274 |
| 2008/0309087 A1 * | 12/2008 | Evulet et al. | 290/52 |

FOREIGN PATENT DOCUMENTS

| | | |
|---|---|---|
| CA | WO0060226 A1 | 10/2000 |
| EP | 1860390 A2 | 11/2007 |

OTHER PUBLICATIONS

Wikipedia. "EcoCute." Retrieved Apr. 24, 2009 from <http://en.wikipedia.org/wiki/EcoCute>.

* cited by examiner

Primary Examiner — Mohammad Ali
(74) Attorney, Agent, or Firm — Kinney & Lange, P.A.

(57) ABSTRACT

A cooling system includes a compressor for compressing a refrigerant from a subcritical state to a supercritical state, a cooler for transferring heat from the refrigerant, an expander for expanding the refrigerant in the supercritical state, an expansion valve for expanding the refrigerant from the supercritical state to the subcritical state and an evaporator for transferring heat from a cooling fluid to the refrigerant in the subcritical state. Work extracted by the expander provides power to the compressor. A method for cooling a vehicle includes compressing a refrigerant from a subcritical state to a supercritical state, cooling the refrigerant, expanding the refrigerant in the supercritical state where work produced by expanding the refrigerant is used to compress the refrigerant, expanding the refrigerant from the supercritical state to the subcritical state, cooling a cooling fluid with the refrigerant in the subcritical state and cooling vehicle components with the cooling fluid.

20 Claims, 5 Drawing Sheets

TRANSCRITICAL FLUID COOLING FOR AEROSPACE APPLICATIONS

BACKGROUND

Some conventional cooling systems on aircraft utilize air cycle cooling. Hot, pressurized air from the engine is cooled and compressed and used to cool avionics systems and environmental systems, such as the cabin and flight deck. Advancements in composite materials have introduced light yet strong composite components to replace heavier metal components on aircraft. For example, aircraft wings can contain multiple composite components to form a largely composite wing. Composite components do have certain drawbacks, however. Some composite components cannot withstand the high temperatures of the pressurized air bled from the engine that is used for cooling. Thus, using conventional air cycle cooling alone can be unsuitable in some aircraft constructed with composite components. In these cases, alternate cooling systems must be used.

One such alternate cooling system is conventional vapor cycle cooling. Conventional vapor cycle cooling utilizes hydrofluorocarbon refrigerants, such as R-134a. Refrigerant vapor cycle systems offer good performance relative to system weight. Minimizing the weight of aircraft systems increases efficiency of the aircraft and reduces fuel consumption. However, due to environmental concerns and potential regulations, reducing or eliminating the use of R-134a and similar refrigerants is desirable. Other refrigerants, such as carbon dioxide, have lower global warming potential. However, conventional carbon dioxide cooling systems are too heavy to be used in aircraft without incurring a substantial negative effect to efficiency and fuel consumption.

SUMMARY

A cooling system includes a compressor for compressing a refrigerant from a subcritical state to a supercritical state, a cooler for transferring heat from the refrigerant in the supercritical state, an expander for expanding the refrigerant in the supercritical state, an expansion valve for expanding the refrigerant from the supercritical state to the subcritical state and an evaporator for transferring heat from a cooling fluid to the refrigerant in the subcritical state. Work extracted by the expander when expanding the refrigerant in the supercritical state is used to provide power to the compressor.

A vehicle vapor cycle cooling system includes a turboexpander system, a cooler, an expansion valve and an evaporator. The turboexpander system has a compressor for compressing a refrigerant from a subcritical state to a supercritical state, a shaft connecting the compressor to an expander where the shaft provides power to the compressor, and an expander for expanding the refrigerant in the supercritical state. Work extracted from expanding the refrigerant is used to provide power to the compressor. The cooler transfers heat from the refrigerant in the supercritical state. The expansion valve expands the refrigerant from the supercritical state to the subcritical state. The evaporator transfers heat from a cooling fluid to the refrigerant in the subcritical state.

A method for cooling a vehicle includes compressing a refrigerant from a subcritical state to a supercritical state, cooling the refrigerant in the supercritical state with a first cooling fluid, expanding the refrigerant in the supercritical state where work produced by expanding the refrigerant is used to compress the refrigerant from the subcritical state to the supercritical state. The method also includes expanding the refrigerant from the supercritical state to the subcritical state, cooling a second cooling fluid with the refrigerant in the subcritical state and cooling vehicle components with the second cooling fluid.

DETAILED DESCRIPTION

The present invention provides an improved cooling system and cooling method for aerospace and other vehicle applications. The cooling system and method can be used to cool avionics as well as aircraft environments (cabin, flight deck, etc.). The cooling system and method utilize a fluid in both its supercritical and subcritical states to increase cooling efficiency and minimize the weight of the cooling system. These characteristics make the cooling system and method of the present invention particularly suitable for aerospace applications. However, the present invention can also find use in other non-aerospace applications.

Figure 1:
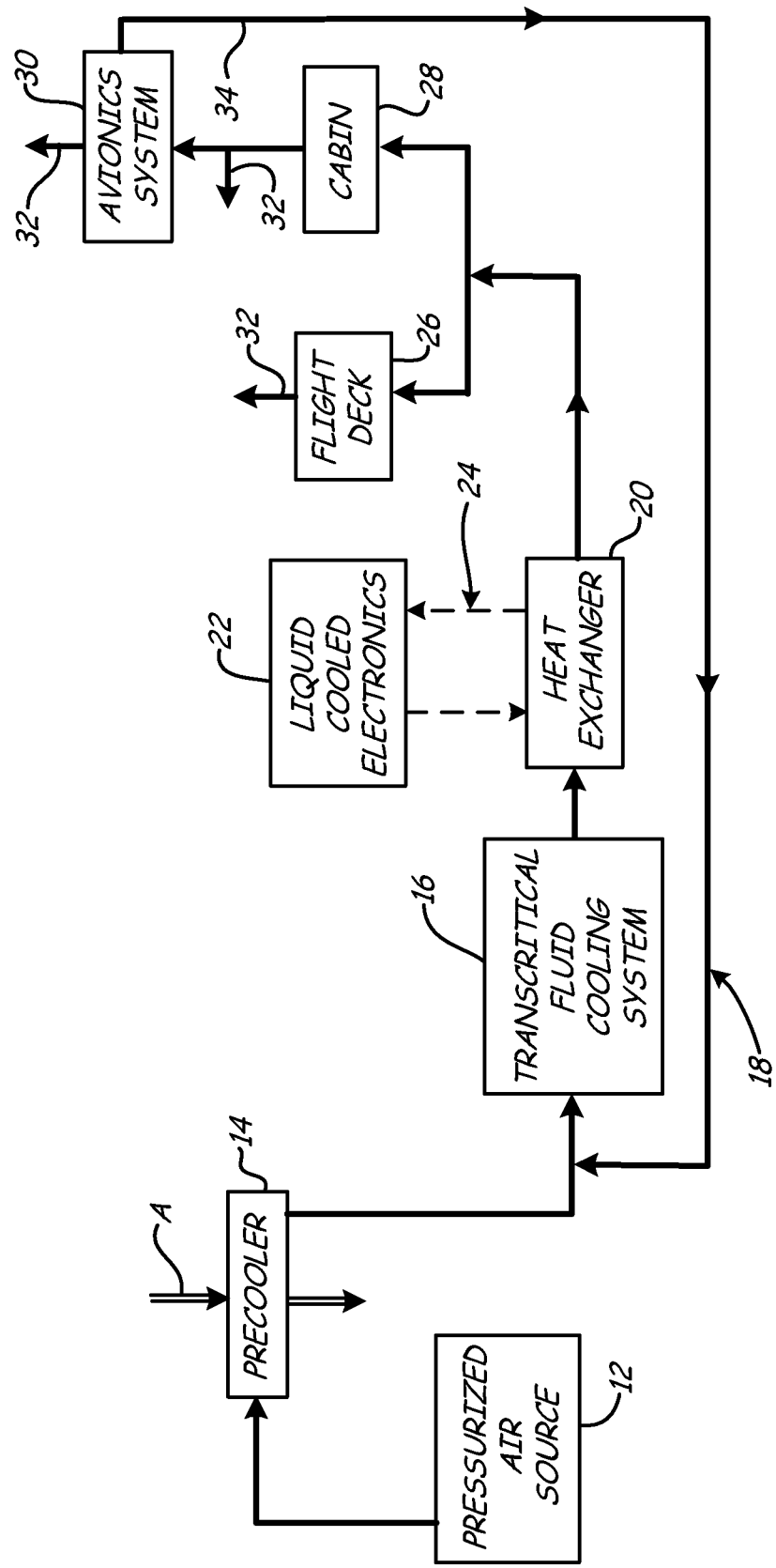
FIG. 1 is a block diagram illustrating a vehicle cooling system.

FIG. 1 illustrates vehicle cooling system 10. Vehicle cooling system 10 includes pressurized air source 12, precooler 14, transcritical fluid cooling system 16 and air cooling loop 18. Pressurized air source 12 is any pressurized air source, including a gas turbine engine, which provides pressurized air to vehicle cooling system 10. When pressurized air source 12 is an engine, the pressurized air is bled from the engine's compressor before it is delivered to the combustor. Pressurized air from pressurized air source 12 is used as a cooling fluid in air cooling loop 18 to directly or indirectly cool electronic, environmental and avionics systems.

Precooler 14 is a heat exchanger that receives pressurized air from pressurized air source 12 and cooling air stream A. Precooler 14 transfers heat from the pressurized air from pressurized air source 12 to cooling air stream A in order to cool the pressurized air. Cooling air stream A received by precooler 14 can be ram air or any other available source of air having a lower temperature than the pressurized air from pressurized air source 12. When pressurized air source 12 is an engine, the pressurized air is cooled in precooler 14 before it encounters composite materials to prevent heat damage to the composite materials. The warmed cooling air stream A leaving precooler 14 is dumped overboard or reused for additional cooling or other purposes. The cooled pressurized air leaving precooler 14 flows to air cooling loop 18 and transcritical fluid cooling system 16. The cooled pressurized air can be mixed with other sources of air, such as recirculated cooling air, before flowing to transcritical fluid cooling system 16.

Transcritical fluid cooling system 16 is a vapor-compression refrigeration cycle system connected to air cooling loop 18 and configured to further cool the pressurized air received from precooler 14 Transcritical fluid cooling system 16 can include one or more compressors, condensers, coolers, expanders, economizing heat exchangers, expansion valves and evaporators. Transcritical fluid cooling system 16 utilizes the supercritical and subcritical properties of a refrigerant to further cool the pressurized air and other air used for cooling. Different embodiments of transcritical fluid cooling system 16 are described in further detail below.

Air cooling loop 18 provides a flow path so that the cooled pressurized air can be used to cool electronic, environmental and avionics systems. Air cooling loop 18 is in communication with transcritical fluid cooling system 16 and can include additional components to facilitate cooling. Air cooling loop 18 can be configured in a variety of different ways to provide cooling to various systems.

Air cooling loop 18 can provide a flow path so that the cooled pressurized air can indirectly cool various systems. In vehicle cooling system 10 illustrated in FIG. 1, air cooling loop 18 includes heat exchanger 20 for cooling liquid cooled electronics system 22. Heat exchanger 20 transfers heat from liquid cooled electronics system 22 to the cooled pressurized air flowing through air cooling loop 18 and heat exchanger 20. By the time the pressurized air reaches heat exchanger 20, the pressurized air has been cooled greatly by both precooler 14 and transcritical fluid cooling system 16. A heat transfer fluid flows through fluid loop 24 connecting heat exchanger 20 and electronics system 22. Suitable heat transfer fluids include water, water/glycol mixtures and polyalphaolefins. Electronics system 22 transfers heat to the heat transfer fluid in fluid loop 24 which then transfers heat to the cooled pressurized air flowing through heat exchanger 20 in order to cool electronics system 22. The cooled pressurized air indirectly cools electronics system 22.

Air cooling loop 18 can also provide a flow path so that the cooled pressurized air can directly cool vehicle systems. In vehicle cooling system 10 illustrated in FIG. 1, air cooling loop 18 is connected to flight deck 26, cabin 28 and avionics system 30. The cooled pressurized air flows through air cooling loop 18 and through flight deck 26 and cabin 28 to directly cool the respective compartments. The cooled pressurized air also flows through avionics system 30 to cool avionics racks and panels. As illustrated in FIG. 1, after cooling the respective system, the cooled pressurized air can be dumped overboard (represented by arrows 32) or directed through return portion 34 of air cooling loop 18 to be cooled again by transcritical fluid cooling system 16 and reused for cooling.

Transcritical fluid cooling system 16 is designed to effectively cool the pressurized air flowing through air cooling loop 18 by using a working fluid (refrigerant) in both its supercritical and subcritical states. A supercritical fluid is a substance at or above both its critical temperature and its critical pressure. A supercritical fluid can adopt properties similar to both a gas and a liquid. For example, carbon dioxide behaves as a gas at STP (0° C., 100 kPa) and as a solid as dry ice (temperatures below −78.5° C.). However, when carbon dioxide is heated above its critical temperature (31.1° C.) and compressed above its critical pressure (about 7400 kPa), it will expand like a gas to fill its container but with a density like that of a liquid. A substance is generally in a subcritical state when the substance is below either its critical temperature or its critical pressure. A substance in a subcritical state can be a liquid, a vapor or a two-phase mixture of liquid and vapor depending on its temperature and pressure.

Figure 2:
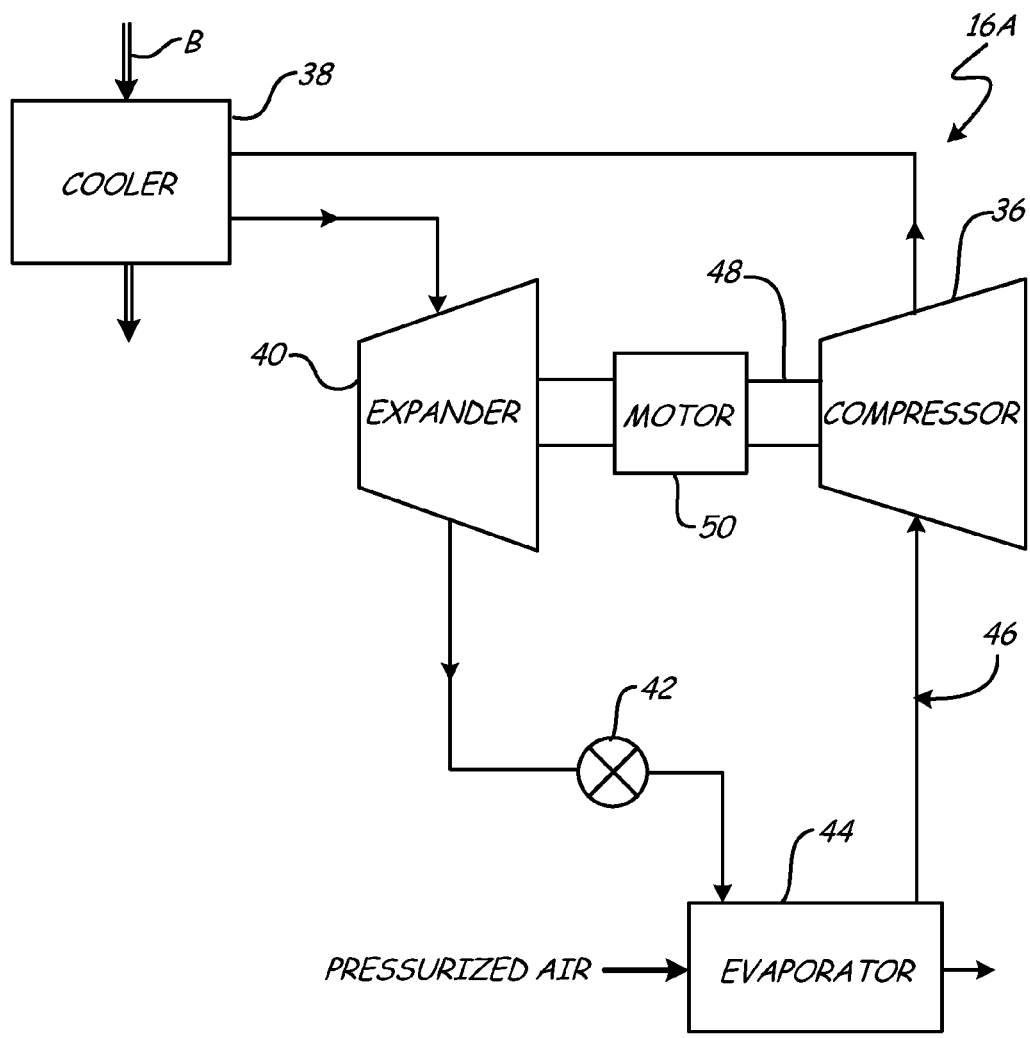
FIG. 2 is a block diagram illustrating a transcritical fluid cooling system.

FIG. 2 illustrates one embodiment (16A) of transcritical fluid cooling system 16. Transcritical fluid cooling system 16A includes compressor 36, condenser 38, expander 40, expansion valve 42, evaporator 44 and fluid loop 46.

Compressor 36 compresses the refrigerant in transcritical fluid cooling system 16. Upon reaching compressor 36, the refrigerant is a subcritical fluid (i.e. having a temperature below the refrigerant's critical temperature or a pressure below the refrigerant's critical pressure). Compressor 36 compresses the refrigerant to a higher pressure, which in turn increases the temperature of the refrigerant. The refrigerant is compressed so that the refrigerant's pressure is above its critical pressure and the refrigerant's temperature is above its critical temperature. Thus, the refrigerant is compressed by compressor 36 until a supercritical refrigerant is produced. The supercritical refrigerant is compressed to a degree so that it can be cooled and expanded and still remain in a supercritical state. Compressor 36 is connected to shaft 48. Motor 50 engages shaft 48 and rotates shaft 48 to produce work that compressor 36 uses to compress the working fluid.

The supercritical refrigerant produced by compressor 36 flows through fluid loop 46 to cooler 38 where it is cooled. Cooling air stream B flows through cooler 38 and heat is transferred from the supercritical refrigerant to cooling air stream B so that the supercritical refrigerant is cooled. Cooling air stream B flowing through cooler 38 can be ram air or any other available source of air having a lower temperature than the supercritical refrigerant in cooler 38. Cooling air stream B flowing through cooler 38 can originate from the same source as cooling air stream A flowing through precooler 14. The supercritical refrigerant cools in cooler 38, but the temperature is kept above the refrigerant's critical temperature.

The cooled supercritical refrigerant flows from cooler 38 through fluid loop 46 to expander 40. Expander 40 is a turbine. The cooled supercritical refrigerant flows through expander 40 and expands to produce work. Expander 40 is connected to shaft 48, and the work produced by expanding the cooled supercritical refrigerant is translated to drive shaft 48 to power compressor 36. Expander 40 can produce enough work to reduce the amount of power drawn from motor 50 to rotate shaft 48 in order to power compressor 36. The refrigerant flowing through expander 40 remains in the supercritical state or is present as a single phase fluid. When the refrigerant is maintained in the supercritical state, the refrigerant's pressure is kept above the critical pressure. By expanding, the cooled supercritical refrigerant is also further cooled in expander 40. The supercritical refrigerant's temperature is kept above the critical temperature. When the refrigerant's temperature or pressure falls below the critical limits, the refrigerant is maintained in a single phase state (i.e. liquid or gas) by regulation of expansion valve 42 (connected to expander 40 via fluid loop 46 as described below). The degree of expansion allowed by expansion valve 42 controls whether the refrigerant in and leaving expander 40 is in the supercritical state or a single phase state.

Maintaining the refrigerant in expander 40 in a supercritical or single phase state improves the performance and efficiency of transcritical fluid cooling system 16A. When the refrigerant in expander 40 is a two-phase mixture of vapor and liquid, expander 40 performs poorly and reduces the performance and efficiency of transcritical fluid cooling system 16A. When the refrigerant in expander 40 is a supercritical or single phase fluid, the performance and efficiency of transcritical fluid cooling system 16A improves. Additionally, because the supercritical refrigerant has a very high pressure, the sizes of the components of transcritical fluid cooling system 16A (e.g., cooler 38, expander 40) can be reduced compared to conventional refrigeration systems, further improving efficiency and reducing the weight of transcritical fluid cooling system 16A. In aircraft cooling systems, minimizing component weight is desirable. Directing a supercritical or single phase refrigerant through expander 40 produces work to power compressor 36, and improves performance and efficiency of and reduces the overall system weight of transcritical fluid cooling system 16A.

The cooled and expanded supercritical refrigerant flows from expander 40 through fluid loop 46 to expansion valve 42. The cooled and expanded supercritical refrigerant flows through expansion valve 42 and again expands. As the cooled and expanded supercritical refrigerant expands, it cools further. The refrigerant expands so that its pressure is below the critical pressure and cools so that its temperature is below the critical temperature, producing a subcritical two-phase refrigerant. The subcritical refrigerant has a very low temperature and a low pressure.

The subcritical refrigerant flows from expansion valve 42 through fluid loop 46 to evaporator 44. According to the embodiment illustrated in FIG. 2, evaporator 44 is a heat exchanger configured to transfer heat from pressurized cooling air to the subcritical refrigerant. In alternative embodiments, evaporator 44 can be configured to transfer heat from a liquid to the subcritical refrigerant. Pressurized air from pressurized air source 12 and cooled in precooler 14 flows through evaporator 44. Heat is transferred from the pressurized air to the subcritical refrigerant in evaporator 44. Because of the very low temperature of the subcritical refrigerant, the pressurized air is cooled considerably to produce cooled pressurized air. The cooled pressurized air is used to indirectly cool liquid cooled electronics 22 via heat exchanger 20 and to directly cool flight deck 26, cabin 28 and avionics system 30 as described above with reference to FIG. 1. The subcritical refrigerant in evaporator 44 absorbs heat and continues through fluid loop 46 back to compressor 36 to repeat the transcritical cycle described above.

Figure 3:
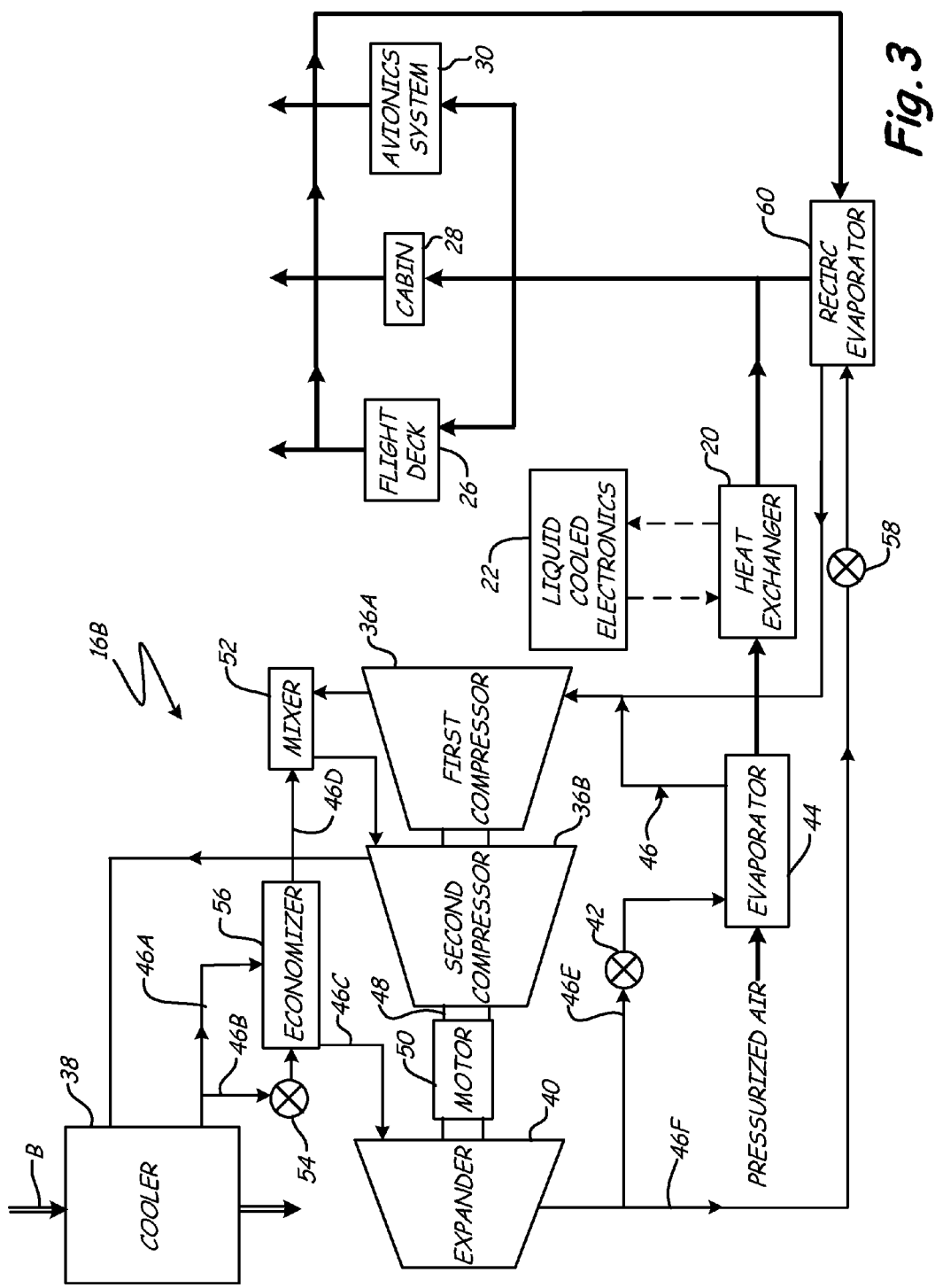
FIG. 3 is a block diagram illustrating another transcritical fluid cooling system.

FIG. 3 illustrates another embodiment: transcritical fluid cooling system 16B, which includes the components of transcritical fluid cooling system 16A, as well as additional components. In addition to cooler 38, expander 40, expansion valve 42, evaporator 44 and fluid loop 46, transcritical fluid cooling system 16B also includes first compressor 36A, second compressor 36B, mixer 52, valves 54 and 58, economizer 56 and recirculation evaporator 60. Cooler 38, expander 40, expansion valve 42, evaporator 44 and fluid loop 46 function in the same way as described above for transcritical fluid cooling system 16A.

Transcritical fluid cooling system 16B includes two compressors, first compressor 36A and second compressor 36B. Refrigerant flows through fluid loop 46 to first compressor 36A. First compressor 36A compresses the refrigerant, raising its temperature and pressure above the respective critical points to form a supercritical refrigerant. The supercritical refrigerant flows through fluid loop 46 to mixer 52 where it mixes with additional supercritical refrigerant (described in greater detail below). The mixed supercritical refrigerant then flows from mixer 52 to second compressor 36B, where it is further compressed, again raising its temperature and pressure. The supercritical refrigerant flows from second compressor 36B to cooler 38. First compressor 36A and second compressor 36B can both be on the same shaft 48 and powered by motor 50 and expander 40 as illustrated in FIG. 3. Alternatively, first and second compressors 36A and 36B can be located on and driven by separate shafts 48.

A portion of the supercritical refrigerant cooled in cooler 38 flows to economizer 56. Economizer 56 is an economizing heat exchanger used to cool the supercritical refrigerant before it reaches expander 40. In alternative embodiments, economizer 56 can be positioned so that it cools the supercritical refrigerant after it reaches expander 40. In transcritical fluid cooling system 16B, fluid loop 46 leaving cooler 38 splits to create two flowpaths (46A and 46B). A first portion of supercritical refrigerant exiting cooler 38 flows through fluid loop 46A to economizer 56. A second portion of the supercritical refrigerant flows through fluid loop 46B to valve 54. The second portion of supercritical refrigerant expands in valve 54. This expansion reduces the temperature of the second portion so that it can be used for cooling. The cooled second portion flows to economizer 56 and cools the first portion of supercritical refrigerant flowing through economizer 56. The first portion of supercritical refrigerant flows from economizer 56 to expander 40 through fluid loop 46C and expands as described above with respect to FIG. 2. The second portion flows to mixer 52 through fluid loop 46D. The pressure of the second portion of supercritical refrigerant flowing through fluid loop 46B is reduced in valve 54 to a pressure slightly higher than the pressure of the second portion of supercritical refrigerant flowing through mixer 52.

Mixer 52 receives refrigerant from first compressor 36A and refrigerant from cooler 38 (the second portion of supercritical refrigerant, after it has expanded and cooled the first portion in economizer 56). Mixer 52 mixes the received streams of refrigerant before the combined refrigerant flows to second compressor 36B. By mixing the two streams of refrigerant, transcritical fluid cooling system 16B can reuse the expanded second portion of refrigerant from cooler 38 at an intermediate step (second compressor 36B) instead of having to start over at first compressor 36A. Mixing allows transcritical fluid cooling system 16B to operate with additional efficiency.

Fluid loop 46 also splits after expander 40. Fluid loop 46 splits into flowpaths 46E and 46F. Fluid loop 46E provides flow from expander 40 to expansion valve 42 and evaporator 44 as described with respect to FIG. 2. As illustrated in FIG. 3, evaporator 44 provides cooling to pressurized air using the cooled refrigerant flowing through fluid loop 46E. The cooled pressurized air flows to heat exchanger 20 in order to cool liquid cooled electronics system 22. Fluid loop 46F provides flow from expander 40 to a separate expansion valve and evaporator.

Refrigerant flows from expander 40 through fluid loop 46F to expansion valve 58 and recirculation evaporator 60. Expansion valve 58 operates in the same way as expansion valve 42, allowing the supercritical refrigerant to expand so that its pressure is below the critical pressure and to cool so that its temperature is below the critical temperature, thereby producing a subcritical refrigerant. The cooled subcritical refrigerant flows to recirculation evaporator 60. Recirculation evaporator 60 operates in generally the same way as evaporator 44. Recirculation evaporator 60 is a heat exchanger configured to transfer heat from recirculated cooling air to the cool subcritical refrigerant. Cooled recirculated cooling air flows to and directly cools flight deck 26, cabin 28 and avionics system 30. The cooling air is either dumped overboard or returned to recirculation evaporator 60 so that it can be cooled by additional cool subcritical refrigerant to directly cool flight deck 26, cabin 28 or avionics system 30 again. The cooled recirculated cooling air can also be mixed with the pressurized air used to indirectly cool liquid cooled electronics 22 via heat exchanger 20.

Figure 4:
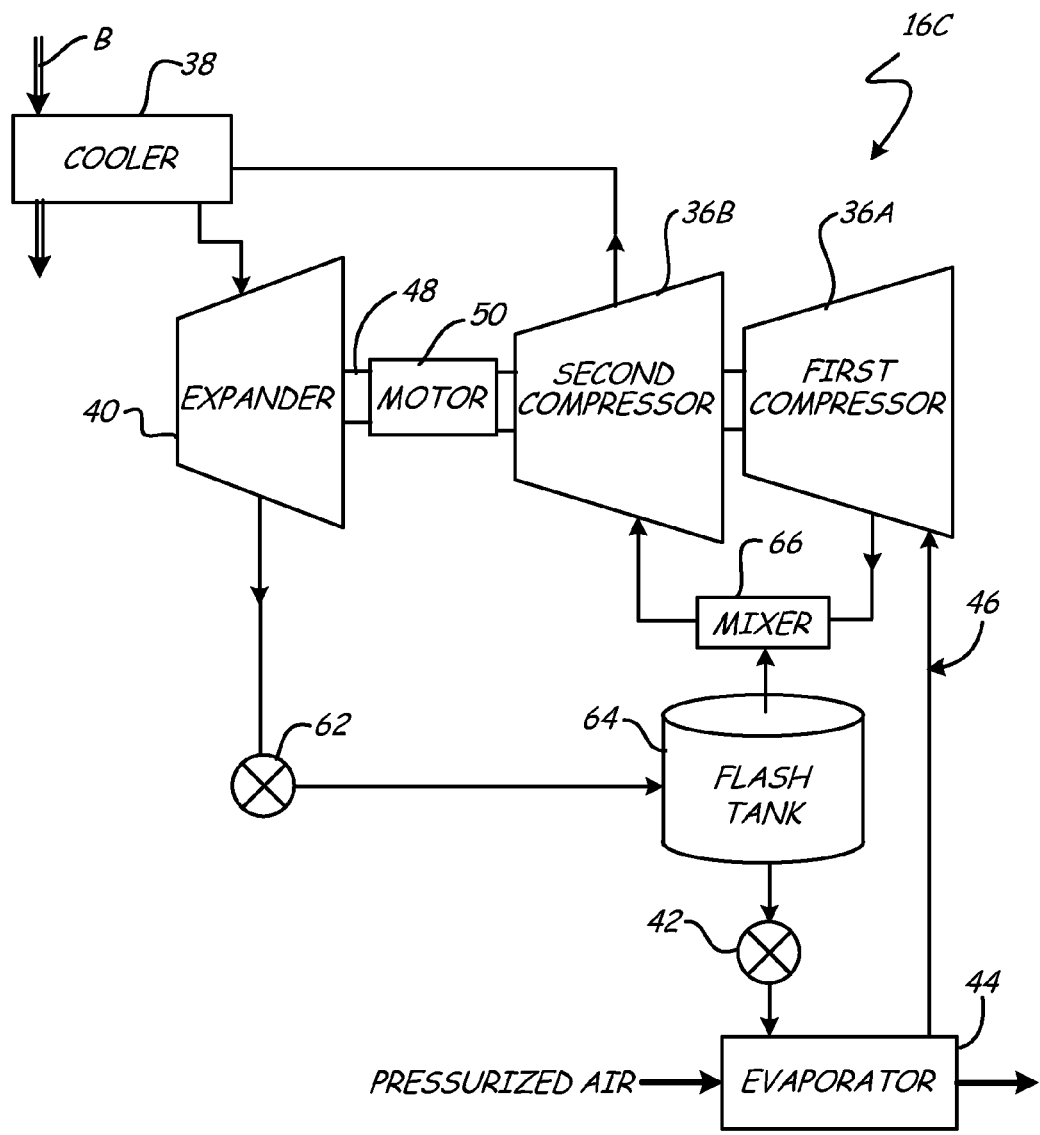
FIG. 4 is a block diagram illustrating yet another transcritical fluid cooling system.

FIG. 4 illustrates another embodiment: transcritical fluid cooling system 16C, which includes the components of transcritical fluid cooling system 16A, as well as additional components. In addition to cooler 38, expander 40, expansion valve 42, evaporator 44 and fluid loop 46, transcritical fluid cooling system 16C includes first compressor 36A and second compressor 36B like transcritical fluid cooling system 16B and also includes expansion valve 62, flash tank 64 and mixer 66. Cooler 38, expander 40, expansion valve 42, evaporator 44, fluid loop 46, first compressor 36A and second compressor 36B function in the same way as described above for transcritical fluid cooling systems 16A and 16B.

Once the cooled supercritical refrigerant exits expander 40, the refrigerant flows through fluid loop 46 to expansion valve 62. Expansion valve 62 operates in a similar fashion to expansion valve 42, allowing the cooled supercritical refrigerant to further expand. The further expanded refrigerant flows from expansion valve 62 to flash tank 64. Flash tank 64 is a pressure vessel that can separate liquid and vapor streams of a mixed phase fluid. Flash tank 64 separates vapor from the cooled supercritical refrigerant, and the separated vapor flows to mixer 66. The liquid flows from flash tank 64 to expansion valve 42 and evaporator 44 where it expands and cools pressurized air from pressurized air source 12. Mixer 66 mixes the vapor exiting flash tank 64 with the refrigerant exiting first compressor 36A. The vapor is cooler than the refrigerant at the compressor outlet, having expanded in expansion valve 62, and cools the refrigerant flowing to the second compressor. The mixed refrigerant flows from mixer 66 to second compressor 36B where the refrigerant is further compressed. By mixing the vapor and refrigerant, the supercritical refrigerant is cooled between compression stages allowing the refrigerant temperature to be reduced further by cooler 38 and expander 40. Mixing cooled, expanded vapor with the supercritical refrigerant allows transcritical fluid cooling system 16C to operate with additional efficiency.

While FIGS. 2 through 4 illustrate a number of embodiments (16A, 16B and 16C) of transcritical fluid cooling system 16, those having skill in the art will appreciate that modifications can be made by combining components from the different embodiments illustrated and/or changing the arrangement of the components.

Figure 5:
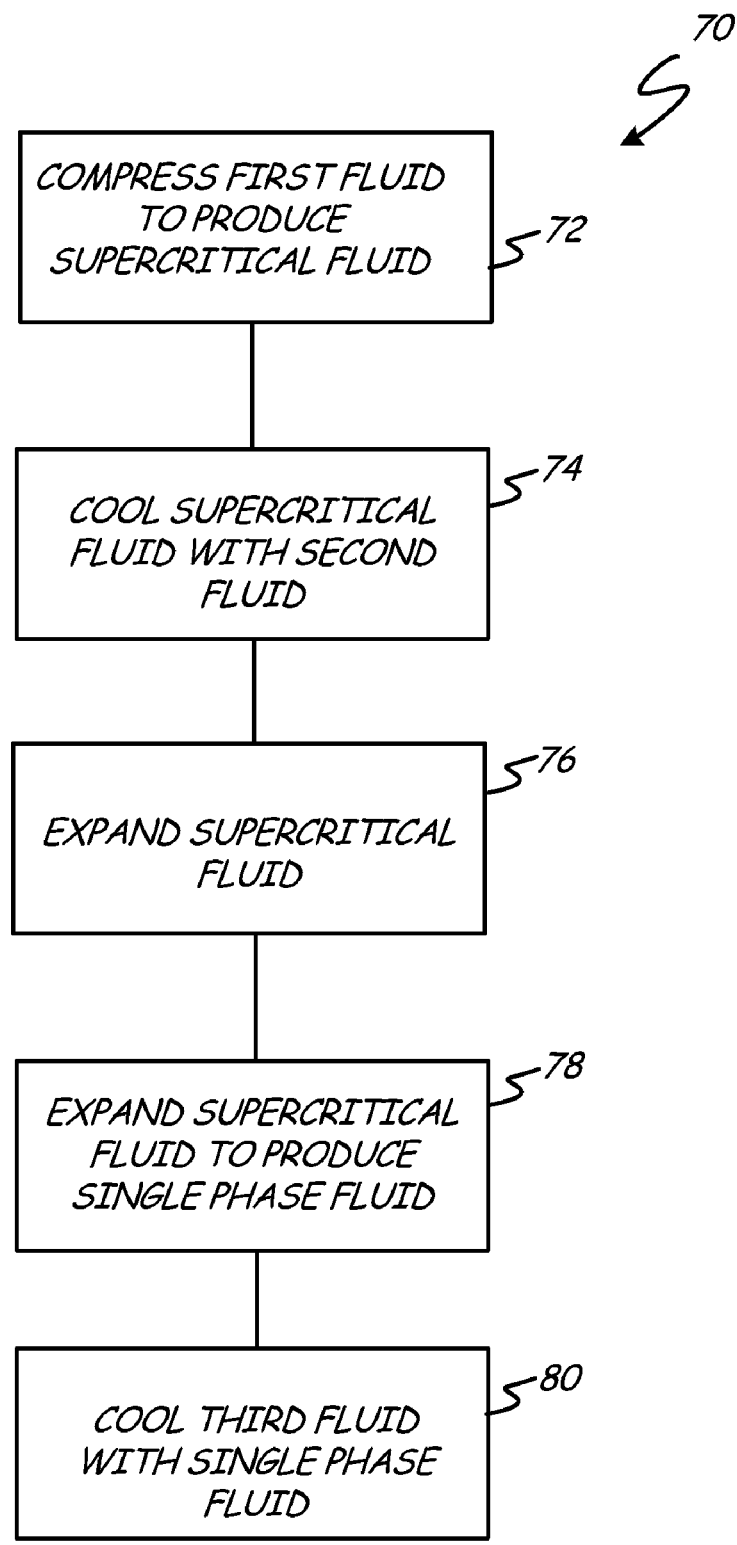
FIG. 5 is a flow diagram illustrating a method for cooling a vehicle using a transcritical fluid.

Transcritical fluid cooling system 16 provides a method for cooling a vehicle. One embodiment of such a method is illustrated in FIG. 5, which illustrates operation of transcritical fluid cooling system 16A shown in FIG. 2. Method 70 includes compressing a subcritical (single phase) refrigerant to produce a supercritical refrigerant (step 72), cooling the supercritical refrigerant with a first cooling fluid (step 74), expanding the supercritical refrigerant to cool the refrigerant and extract power (work) (step 76), expanding the supercritical refrigerant to produce a subcritical refrigerant (step 78) and cooling a second cooling fluid with the subcritical refrigerant (step 80).

In one embodiment, the subcritical refrigerant is gaseous carbon dioxide and the carbon dioxide is compressed in compressor 36 to produce supercritical carbon dioxide in step 72. Carbon dioxide is compressed until it is above its critical pressure of 7400 kPa. As a result of the compression the temperature of the carbon dioxide exceeds its critical temperature (31.1° C.). In step 74, the supercritical carbon dioxide is cooled with ram air (first cooling fluid) in cooler 38. The cooled supercritical carbon dioxide flows from cooler 38 to expander 40. In step 76, the cooled supercritical carbon dioxide expands until it is slightly above its two-phase transition point so that the carbon dioxide is maintained as a single phase fluid. As the carbon dioxide expands, it produces work, which is used to power compressor 36 for compressing additional carbon dioxide. Expanding the supercritical carbon dioxide cools the carbon dioxide. In step 78, the cooled supercritical carbon dioxide further expands at expansion valve 42 to produce two-phase carbon dioxide. The cooled carbon dioxide flows to evaporator 44 and cools pressurized air (second cooling fluid) from pressurized air source 12. The cooled pressurized air is then used to directly and/or indirectly cool various vehicle components as described above.

The present invention provides for a transcritical fluid cooling system for cooling vehicle components. The cooling system takes advantage of a refrigerant in both supercritical and subcritical states to provide an efficient cooling system while minimizing the weight of the cooling system. The refrigerant is compressed to produce a supercritical refrigerant, cooled, expanded to produce work and further expanded to produce a cool subcritical refrigerant used to cool a cooling fluid.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A cooling system comprising:
    a compressor for compressing a refrigerant from a subcritical state to a supercritical state;
    a cooler for transferring heat from the refrigerant in the supercritical state;
    an expander for expanding the refrigerant in the supercritical state and extracting work from expanding the refrigerant to provide power to the compressor;
    an expansion valve located downstream of the expander for maintaining the refrigerant in a supercritical or single phase state within the expander and expanding the refrigerant from the supercritical state to the subcritical state; and
    an evaporator for transferring heat from a cooling fluid to the refrigerant in the subcritical state.

2. The system of claim 1, wherein the refrigerant comprises carbon dioxide, and wherein the compressor compresses carbon dioxide so that the carbon dioxide has a pressure and a temperature above a critical pressure and a critical temperature to produce supercritical carbon dioxide.

3. The system of claim 1, further comprising:
    a shaft connecting the expander and compressor, wherein work extracted by the expander rotates the shaft to provide power to the compressor; and
    a motor for rotating the shaft to provide additional power to the compressor.

4. The system of claim 3, further comprising:
    a second compressor for further compressing the refrigerant, wherein the second compressor is connected to the shaft.

5. The system of claim 4, further comprising:
    an economizer for cooling the refrigerant in the supercritical state before expanding the refrigerant in the expander.

6. The system of claim 1, wherein the cooler transfers heat from the refrigerant in the supercritical state to ram air, and wherein the cooling fluid comprises pressurized air, and wherein the evaporator transfers heat from the pressurized air to the refrigerant in the subcritical state.

7. The system of claim 1, further comprising:
    a second compressor for further compressing the refrigerant.

8. The system of claim 7, further comprising:
    an economizer for cooling the refrigerant in the supercritical state before expanding the refrigerant in the expander.

9. The system of claim 1, further comprising:
a flash tank connected to the compressor and the evaporator for separating the refrigerant in the supercritical state into a vapor stream and a liquid stream, wherein the vapor stream flows to the compressor and the liquid stream flows to the evaporator.

10. The system of claim 1, further comprising:
a second evaporator for transferring heat from a second cooling fluid to the refrigerant in the subcritical state.

11. A vehicle vapor cycle cooling system comprising:
a turboexpander system comprising:
   a compressor for compressing a refrigerant from a subcritical state to a supercritical state;
   an expander for expanding the refrigerant in the supercritical state; and
   a shaft connecting the compressor to the expander, wherein work extracted from expanding the refrigerant is used to provide power to the compressor via the shaft;
a cooler for transferring heat from the refrigerant in the supercritical state;
an expansion valve located downstream of the expander for maintaining the refrigerant in a supercritical or single phase state within the expander and expanding the refrigerant from the supercritical state to the subcritical state; and
an evaporator for transferring heat from a cooling fluid to the refrigerant in the subcritical state.

12. The system of claim 11, wherein the refrigerant comprises carbon dioxide, and wherein the compressor compresses carbon dioxide so that the carbon dioxide has a pressure and a temperature above a critical pressure and a critical temperature to produce supercritical carbon dioxide.

13. The system of claim 11, wherein the cooler transfers heat from the refrigerant in the supercritical state to ram air, and wherein the cooling fluid comprises pressurized air, and wherein the evaporator transfers heat from pressurized air to the refrigerant in the subcritical state.

14. The system of claim 11, further comprising:
a second compressor for further compressing the refrigerant; and
an economizer for cooling the refrigerant in the supercritical state before expanding the refrigerant in the expander.

15. The system of claim 11, further comprising:
a second evaporator for transferring heat from a second cooling fluid to the refrigerant in the subcritical state.

16. A method for cooling a vehicle, the method comprising:
compressing a refrigerant from a subcritical state to a supercritical state;
cooling the refrigerant in the supercritical state with a first cooling fluid;
expanding the refrigerant in the supercritical state in a first expander, wherein the refrigerant is maintained in a supercritical or single phase state within the first expander, and wherein work produced by expanding the refrigerant in the first expander is used to compress the refrigerant from the subcritical state to the supercritical state;
expanding the refrigerant from the supercritical state to the subcritical state in a second expander;
cooling a second cooling fluid with the refrigerant in the subcritical state; and
cooling vehicle components with the second cooling fluid.

17. The method of claim 16, wherein the refrigerant is carbon dioxide, and wherein the first cooling fluid is ram air and the second cooling fluid is pressurized air.

18. The method of claim 16, further comprising:
cooling a liquid coolant with the second cooling fluid, wherein the liquid coolant cools the vehicle components.

19. The method of claim 16, further comprising:
expanding a first portion of the refrigerant in the supercritical state; and
cooling a second portion of the refrigerant in the supercritical state with the first portion.

20. The method of claim 16, further comprising:
cooling the second cooling fluid with the first cooling fluid before the second cooling fluid is cooled with the refrigerant in the subcritical state.

* * * * *